United States Patent
Doerr (10) Patent No.: US 6,266,460 B1
(45) Date of Patent: Jul. 24, 2001

(54) LARGE-CHANNEL-COUNT PROGRAMMABLE WAVELENGTH ADD-DROP

(75) Inventor: Christopher R. Doerr, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/327,979

(22) Filed: Jun. 8, 1999

(51) Int. Cl.[7] ....................................... G02B 6/26
(52) U.S. Cl. ............................ 385/16; 385/24; 385/37; 359/130
(58) Field of Search ................... 385/14, 15, 16, 385/24, 37; 359/127, 128, 130

(56) References Cited

U.S. PATENT DOCUMENTS

| | | | |
|---|---|---|---|
| 5,412,744 | * 5/1995 | Dragone | 385/24 |
| 5,488,500 | * 1/1996 | Glance | 359/127 |
| 5,748,349 | * 5/1998 | Mizrahi | 359/130 |
| 5,778,118 | * 7/1998 | Sridhar | 385/24 |
| 5,812,709 | * 9/1998 | Arai et al. | 385/16 |
| 5,920,666 | * 7/1999 | Digonnet et al. | 385/16 |
| 5,974,207 | * 10/1999 | Aksyuk et al. | 385/24 |

* cited by examiner

Primary Examiner—Rodney Bovernick
Assistant Examiner—Jennifer Doan
(74) Attorney, Agent, or Firm—Baker & McKenzie (57) ABSTRACT

A high-channel-count add/drop filter for use in an optical data communications network. The filter is implemented as an integrated planar lightwave circuit. The filter provides flat-top passbands with negligible chromatic dispersion but without excessive loss. Furthermore, multiple adjacent "through" channels are used to make up a wider flat-top passband that is suitable for passing future generation traffic such as $\geq 100$ Gb/s data streams.

11 Claims, 6 Drawing Sheets

FIG. 7B

LARGE-CHANNEL-COUNT PROGRAMMABLE WAVELENGTH ADD-DROP

FIELD OF THE INVENTION

The present invention relates to data communications methods and apparatus.

BACKGROUND INFORMATION

Wavelength-division multiplexed (WDM) optical networks often require dynamic filters at nodes that can have each channel either pass the node without distortion or be diverted into the node and provide a replacement. Examples of such filters integrated onto a single chip have been described. (See K. Okamoto et al., "16-channel optical add/drop multiplexer consisting of arrayed-waveguide gratings and double-gate switches," Electron. Lett., vol. 32, pp. 1471–1472, 1996; C. G. M. Vreeburg, et al., "First InP-based reconfigurable integrated add-drop multiplexer," IEEE Photon. Technol. Lett., vol. 9, pp. 188–190, 1997; L. Eldada et al., "Integrated multichannel OADM's using polymer Bragg grating MZI's," IEEE Photon. Technol. Lett., vol. 10, pp. 1416–1418, 1998; C. K. Madsen et al., "A multi-port add/drop router using UV-induced gratings in planar waveguides," Optical Fiber Communications Conference, Paper ThH3, pp. 104–106, 1999; and C. R. Doerr et al., "Arrayed waveguide lens wavelength add-drop in silica," IEEE Photon. Technol. Lett., vol. 11, pp. 557–559, 1999.)

Such known single-chip add/drop filters suffer from several substantial limitations including waveguide crossings, low channel count and difficulty in matching and controlling component characteristics. Large numbers of waveguide crossings require more chip real estate, leading to larger devices with lower channel counts and complex topologies.

SUMMARY OF THE INVENTION

The present invention provides an integrated drop/add filter for use in WDM networks. Devices in accordance with the present: invention overcome many of the limitations of known single-chip devices.

A first embodiment of a drop/add filter in accordance with the present invention comprises a planar lightwave circuit which includes a demultiplexer which is coupled to an input and demultiplexes a plurality of wavelength channels at the input into a plurality of demultiplexer outputs. Each demultiplexer output corresponds to one of the plurality of wavelength channels. Each of a plurality of waveguides are coupled to a demultiplexer output and a plurality of optical switches are coupled to each of the plurality of waveguides. A plurality of mirrors and output ports, arranged alternately, are coupled to the optical switches. Each optical switch selectively directs a corresponding wavelength channel to a mirror or to an output.

In a further embodiment of a drop/add filter of the present invention, two demultiplexer outputs are provided for each wavelength channel. Optical switches coupled to the demultiplexer outputs selectively direct the two portions of a wavelength channel either to a pair of mirrors or to a coupler. Each coupler is coupled to an add and a drop port. By providing two passbands per channel, this arrangement achieves flat-top passbands without excess loss.

Advantages of the device of the present invention include: flat-top passbands with negligible chromatic dispersion and without excess loss; no performance fading from multipath interference; no waveguide crossings; a compact size; the performance of a dilated switch with only one switch. Additionally, a device in accordance with the present invention has no need to wavelength-align multiple filters, and maintains relative channel polarizations. Furthermore, multiple adjacent "through" channels are used to make up a wider flat-top passband that is suitable for passing future generation traffic such as $\geq 100$ Gb/s data streams.

DETAILED DESCRIPTION

Figure 1:
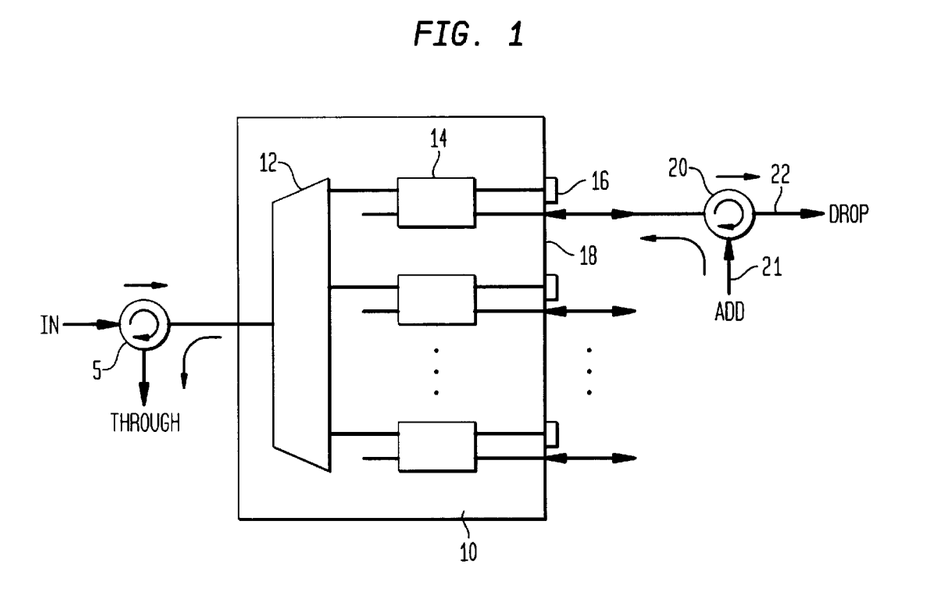
FIG. 1 is a block diagram of an exemplary embodiment of an add/drop device in accordance with the present invention.

FIG. 1 is a block diagram of an exemplary embodiment of an add/drop device 10 in accordance with the present invention. The device 10 can be coupled to a wavelength-division multiplexed (WDM) ring network (not shown) via a circulator 5. The device 10 comprises a demuliplexer 12 and a switch 14 coupled to each demultiplexed port of the demultiplexer 12. The demultiplexer 12 can be implemented using a waveguide grating (such as described in M. K. Smit et al., "Phasar based WDM devices: Principles, design and applications," IEEE J. Select. Topics Quantum Electron., vol. 2, pp. 236–250, 1996; H. Takahashi et al., "Arrayed-waveguide grating for wavelength division multi/demultiplexer with nanometer resolution," Electron. Lett., vol. 26, pp. 87–88, 1990; or C. Dragone, "An N×N optical multiplexer using a planar arrangement of two star couplers," IEEE Photon. Technol. Lett., vol. 3, pp. 812–815, 1991, herein "Dragone 1991".)

Input channels pass through the circulator 5, enter the device 10 and are demultiplexed, as a function of wavelength, by the demultiplexer 12. Each switch 14 routes a demultiplexed signal either to a mirror 16 or to an add/drop port 18 arranged on the right-hand facet of the device 10. Signals routed to the mirror 16 are reflected back through the switch 14, back through the demultiplexer 12 and back out to the ring network via the "through" port of the circulator 5.

The add/drop port 18 acts as a bidirectional port to add and drop data. An external circulator 20 coupled to the add/drop port 18 can provide separate add and drop ports 21 and 22, respectively.

The switches 14 can be implemented as ×2 or 1×2 Mach-Zehnder switches. Each Mach-Zender switch comprises two couplers connected by waveguides containing phase shifters.

Figure 2:
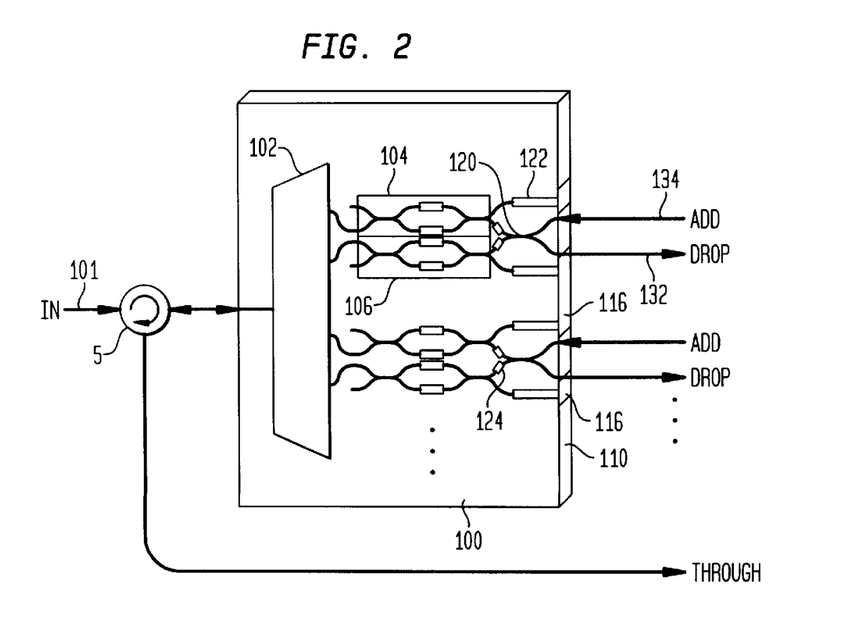
FIG. 2 is a block diagram of a further exemplary embodiment of an add/drop device in accordance with the present invention.

FIG. 2 is a block diagram of a further exemplary embodiment of an add/drop device 100 in accordance with the present invention. The device 100 comprises a demultiplexer 102 which can be implemented as a waveguide grating router. In order to achieve flat-top passbands without excess loss, a plurality of passbands are provided for each channel of the device of FIG. 2. In the exemplary embodiment of FIG. 2, two passbands are provided for each channel, although embodiments with more than two passbands per channel are possible within the scope of the present invention. Using the technique of star coupler degree of freedom limitation, the number of grating arms equals the number of passbands in the grating free-spectral range. (See C. R. Doerr et al., "Dynamic wavelength equalizer in silica using the single-filtered-arm interferometer," IEEE Photon. Technol. Lett., vol. 11, pp. 581–583, 1999.) The number of passbands in the grating free-spectral range is at least as large as the number of passbands that are used to carry data. To improve channel uniformity, it is preferable to use only a subset of the total number of grating arms, preferably in the middle of the grating free-spectral range. As such, in an exemplary 40 channel device, the demultiplexer 102 comprises 124 grating arms with 22 unused arms at each end of the grating free-spectral range and 80 arms in the middle of the range used to carry two passbands for each of the 40 channels. This causes the passbands to overlap in exactly the correct manner to achieve a low-loss, ripple-free, flat-top passband between the "In" and "Through" ports of the circulator 5. Furthermore, such results are achievable despite fabrication variations.

Once through the demultiplexer 102, the two halves of each channel then proceed to a pair of Mach-Zehnder switches 104, 106. The switches are activated thermooptically, by heating chrome strips arranged over the waveguides. The heated arms of the Mach-Zehnder pair are preferably placed in close proximity so as to share the heating and thus reduce power consumption.

A striped high-reflection (HR) coating is deposited on the right-hand facet 110 of the device 100, thereby forming HR stripes or mirrors 116 on the facet. The HR coating can be dielectric or metallic, for example. With no power applied to the switches 104, 106, the signals are routed to the mirrors 116 on the facet 110. The signals are then reflected back through the switches 104, 106, grating 102, and circulator 5 and continue down the transmission line.

If the switches 104, 106 of a channel are activated, however, the two halves of the channel are directed to a 50/50 coupler 120 where they become two passbands and exit the device 100 between the HR stripes 116. The two passbands are typically flat-topped. The actual shapes of the passbands depend on the phase difference between the two paths. One port can be used as a drop port 132 and the other as an add port 134. (Although the add port is used as an input, the add port will typically contain light from the drop channel traveling away from the device 100.) In order to minimize back reflections, the ports 132, 134 as well as the output fibers are preferably arranged at an angle, e.g., 8°, relative to the facet 110, in the plane of the device. The drop receivers and add transmitters should preferably have high return loss.

As an alternative to providing two ports 132 and 134 for each channel, with one port acting as an add port and the other as a drop port, one of the two ports can be used as a single add/drop port, as in the embodiment of FIG. 1. An external circulator (not shown) could be coupled to the add/drop port, as shown in FIG. 1.

Because the through channels cross the Mach-Zehnder switches 104, 106 twice, and because there are no waveguide crossings to couple light among channels, the switching extinction ratio can be extremely high, despite significant fabrication-related variations in the coupling ratios in the switches.

An exemplary embodiment of a 40-wavelength (or channel) add-drop filter device in accordance with the present invention will now be described. The exemplary 40-wavelength device has 100-GHz channel spacing and has flattened passbands without excess loss. For TE polarized light, the insertion loss has been measured to be 9–11 dB for the through channels, and the dropping extinction ratio is $\geq 33$ dB. The device is planar and is made in $SiO_2$ on Si with $\Box n/n \sim 0.65\%$, where n is the index of refraction.

The total path lengths of the lower 40 output ports (i.e., channels 1–20) of the grating are the same. Likewise, the total path lengths of the upper 40 output ports (channels 21–40) are the same. For fabrication robustness, the straight parts and curved parts each independently have the same total lengths, as described in C. R. Doerr et al., "Proposed optical cross connect using a planar arrangement of beam steerers," IEEE Photon. Technol. Lett., vol. 11, pp. 197–199, 1999. As a result, except between channels 20 and 21, there is no chromatic dispersion for the through channels (except perhaps for waveguide and silica dispersion). Between channels 20 and 21 there is a jump of 4.2 ps (round trip), but this is only at their edges and should have negligible impact on most data streams. Also, having all the output ports in close proximity and integrated on a single chip insures that the relative phases and polarizations will not drift over time, preventing the performance fading due to multipath interference observed in fiber-connected devices, as described in E. L. Goldstein et al., "Scaling limitations in transparent optical networks due to low-level crosstalk," IEEE Photon. Technol. Lett., vol 7, pp. 93–94, 1995.

Because the polished right-hand facet of the device cannot be easily polished at exactly a right angle with respect to the waveguides that are coupled to the mirrors 116, and because of fabrication imperfections, however, all of the passbands for the through channels may not be in phase when the device is first made. As such, trimmers 122 are preferably provided over the waveguides between the switches 104, 106 and the mirrors 116 on the right-hand facet 110, as shown in FIG. 2. The trimmers 122 can be implemented as long chrome strips arranged over the waveguides. Heating up a waveguide to a very high temperature using a trimmer results in a permanent phase shift. (See K. Moriwaki et al., "New silica-based 8×8 thermo-optic matrix switch on Si that requires no bias power," Optical Fiber Communications Conference, paper WS1, pp. 211–212, 1995.) The combination of a long trimmer 122 (e.g., 6.5 mm) and the fact that the signal passes through the trimmer twice allows up to a +n phase shift of trim.

Additionally, shorter trimmers 124 can be arranged on the waveguides between the switches 104, 106 and the 50/50 coupler 120, as shown in FIG. 2. The trimmers 124 allow control over the relative phases of the two channel halves before they interfere. The path lengths are designed to be equal, and the coupler 120 provides a ±90° phase shift. The result is two identical flat-top passbands (except for opposite slopes in phase across the passbands), one in the add port and one in the drop port for each channel.

Figure 3:
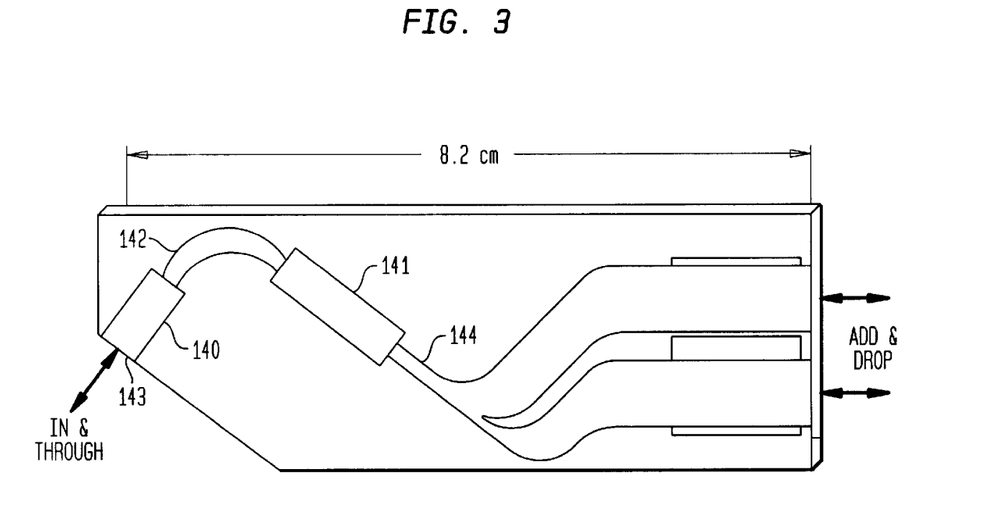
FIG. 3 shows a chip layout of an exemplary 40-channel add-drop device in accordance with the present invention.

FIG. 3 shows an exemplary chip layout of the exemplary 40-channel add-drop device of the present invention. As shown in FIG. 3, because the passbands strongly overlap and because there are preferably a large number of channels, the port waveguides are close together at the star coupler 141 and stay close together for a long distance. Tapers may be used at the port inlets large enough so that the waveguides are uncoupled at the star coupler. This results in a higher loss (>2 dB), higher side lobes, and a larger device. Mutual coupling in the port waveguides, to first order, results in a quadratic phase distortion in the grating 142. (See C. Dragone, "An N×N optical multiplexer using a planar arrangement of two star couplers," IEEE Photon. Technol. Lett., vol. 3, pp. 812–815, 1991.) Thus the mutual coupling can be compensated to first order by shortening the distance between the input fiber inlet 143 and the grating 142. Because it may not be possible to precisely predict the amount of mutual coupling, the input fiber can be connected directly to the input star coupler 140, and the input star coupler 140 cut back until the passband shoulders are minimized. For channel uniformity, the port waveguides should not start bending until they are sufficiently far apart. Because the transverse magnetic (TM) polarized light has a slightly lower effective $\Delta n/n$ than the transverse electric (TE) polarized light, TM light has more mutual coupling and thus a shorter optimum input focal length. The exemplary device is optimized for TE-polarized light.

An exemplary 40-channel device was built and tested. The measurement results obtained will now be discussed.

Figure 4A:
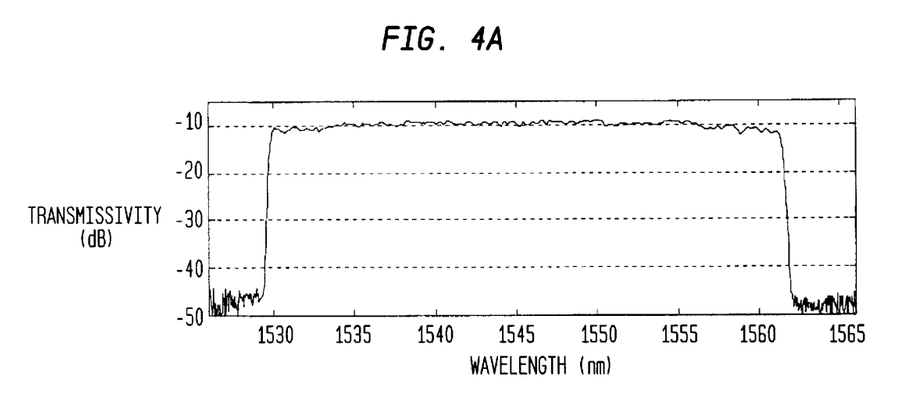
FIGS. 4A and 4B show the transmissivities measured with a resolution bandwidth of 0.1 nm from the in port to the through port for two different configurations of an exemplary device of the present invention.
Figure 4B:
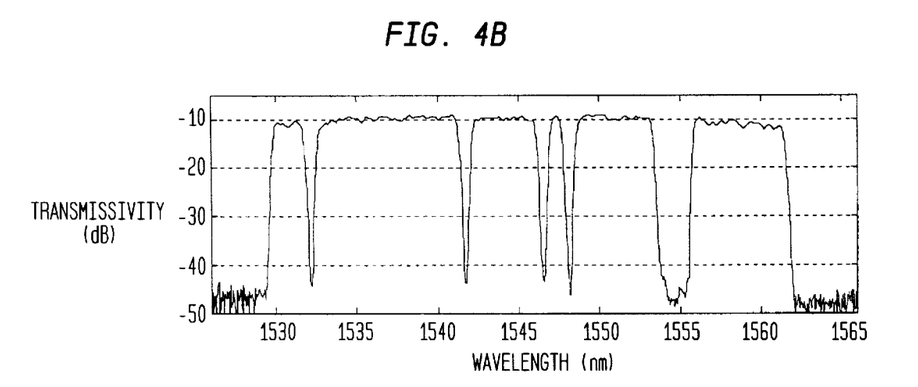

Initially, the transmissivity spectrum from the in to the through port exhibited many narrow dips (some >10 dB deep) due to passband phase differences. After permanently trimming the reflection waveguides with the trimmers 122, the measured transmissivity for the through channels, with all channels switched through, is as shown in FIG. 4A (with a measurement resolution bandwidth of 0.1 nm). FIG. 4B shows the transmissivity measured with channels 8, 9, 10, 17, 19, 25, and 37 dropped (counting right to left). Measurements include the circulator and TE polarized light was used.

Figure 5:
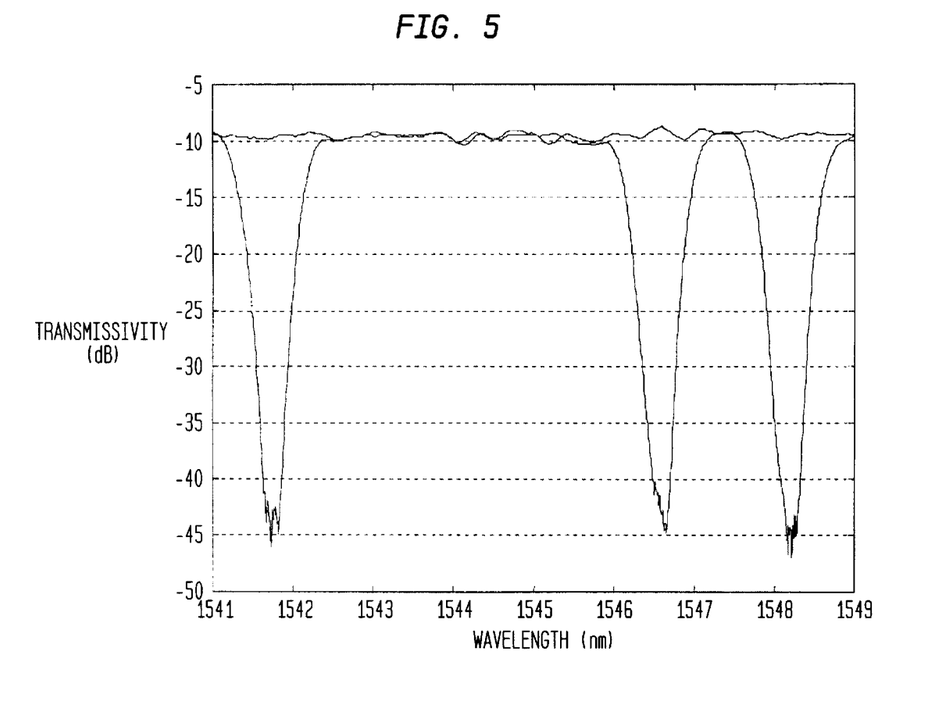
FIG. 5 shows an enlarged view of the transmissivities of FIGS. 4A and 4B with a resolution bandwidth of 0.05 nm.

As shown in FIGS. 4A and 4B, the passband ripple is 0.5 dB peak-to-peak in most places, rising to 1 dB in others. The ripple can be reduced further by more careful trimming and by decreasing fabrication imperfections. As can be seen, the through-channel loss is 9 dB, increasing to 11 dB for the longest wavelength channels. FIG. 5 shows an enlarged view of a portion of the transmissivities shown in FIGS. 4A and 4B, with a measurement resolution bandwidth of 0.05 nm.

In the exemplary device built, a channel could be dropped using a power of 1.0 W (i.e., switching both passband halves). The drop extinction is ~33 dB when dropping a channel surrounded by through channels, the limit appearing to come from the grating side lobes. Primarily because the numerical aperture of the input fiber was underestimated and because of second order phase errors in the grating due to mutual coupling in the waveguides 144, the grating has high sidelobes next to its passbands. (See Dragone 1991.) This can be remedied by widening the input collection angle of the grating and by modifying the path lengths in the grating to compensate for the phase errors. Dropping multiple adjacent channels gives an extinction ratio of approximately 39 dB, which is about the same level as can be seen to the left and right of the main passband in FIG. 4A. This is likely limited by the circulator.

Figure 6A:
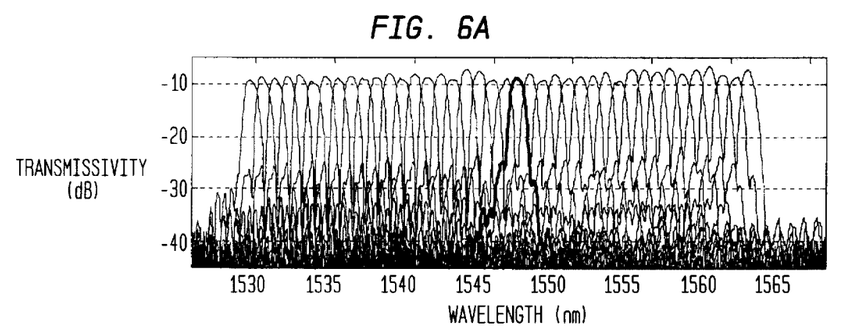
FIGS. 6A and 6B show measured transmissivities from the in port to the upper and lower add-drop ports, respectively, of each channel of an exemplary device of the present invention.
Figure 6B:
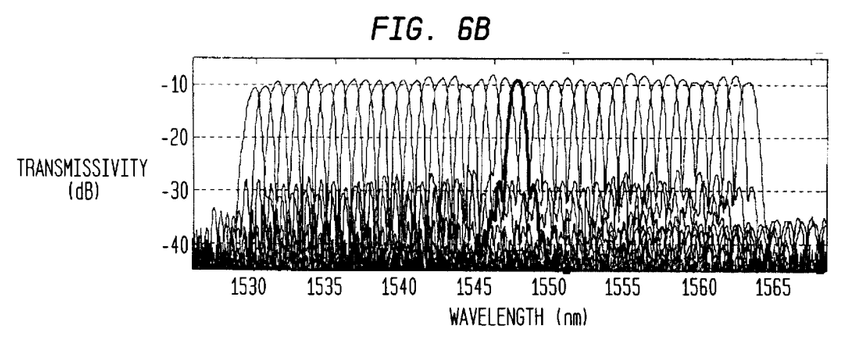

FIGS. 6A and 6B show the measured transmissivities from the "In" port 101 to the upper and lower add-drop ports, 134 and 132 respectively, of each channel. The add-drop trimmers were permanently trimmed to make the two passbands roughly equal (except for channels 1, 20, and 40, in which cases, because of edge effects, the needed phases were too large to achieve by trimming, and thus a voltage was applied during the measurement). One passband would be used as the "drop" port and one as the "add" port for each channel. Measurements include the circulator. TE polarization was used and the measurements were made with a resolution bandwidth of 0.1 nm.

Figure 7A:
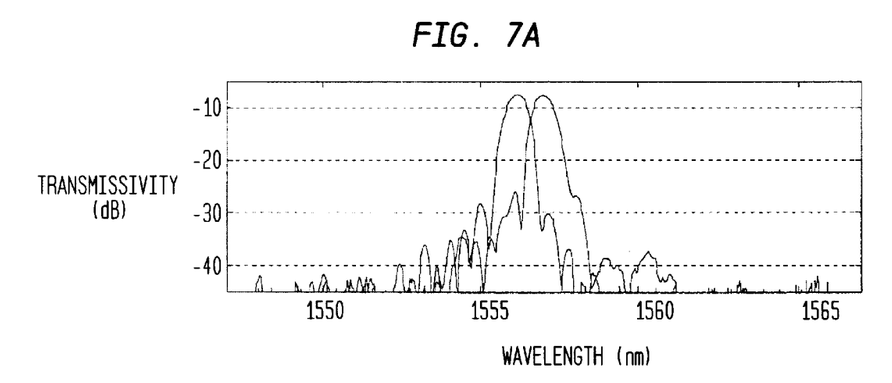
FIGS. 7A and 7B show measured transmissivities from the in port to the upper and lower ports for two channels of an exemplary add/drop device in accordance with the present invention for which the add-drop phases were adjusted.
Figure 7B:
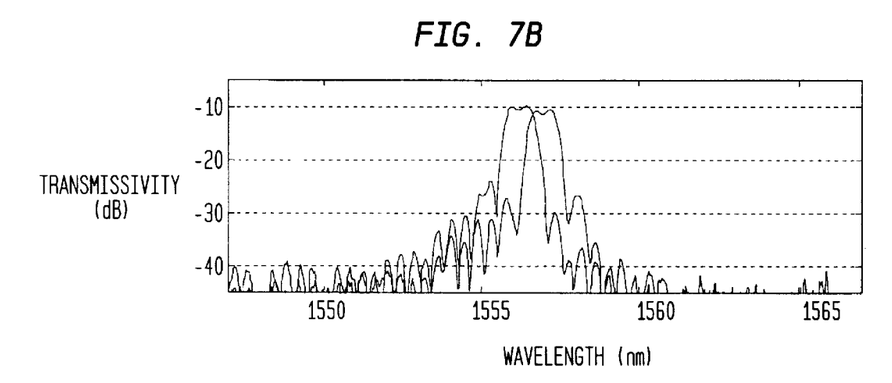

The transmissivities between the in and add and drop ports (shown in FIGS. 6A and 6B) were measured by dropping one channel at a time via the switches and bringing up the fiber to the port to be measured. It was found that it would be highly beneficial to be able to trim the 50/50 coupler that combines the two passbands. Nevertheless, by using the short trimmers, one could make the add and drop ports both have reasonably flat and low-loss passbands. The typical loss between the in and add/drop ports is ~9 dB. The non-adjacent channel crosstalk is <−30 dB; however, the adjacent channel crosstalk is only ~−15 dB. Except for the sidelobes, which can be reduced by increasing the numerical aperture of the input side of the grating and correcting the phase errors, as explained above, the high adjacent-channel crosstalk is from the significant passband overlap used to obtain the ripple-free through spectrum. One way to improve this is to adjust the phases of the add/drop ports so that the drop ports have a higher and rounder passband than the add ports. Such a case for two of the channels is shown in FIGS. 7A and 7B (voltages were applied during the measurement to the short trimmers). FIGS. 7A and 7B show measured transmissivities from the "In" port 101 to the upper and lower ports 134, 132 for two adjacent channels, respectively, of an exemplary add/drop device in accordance with the present invention for which the add-drop phases were adjusted so as to give the drop passbands improved crosstalk and loss at the expense of the add passbands. In this case, the adjacent channel crosstalk (except for the sidelobes) decreases to <−20 dB for the drop channels. The crosstalk increases for the add channels, but usually this does not matter. In FIGS. 7A and 7B a resolution bandwidth of 0.1 nm is used.

The above measurements are for TE-polarized light. The TM responses are similar except that the ripple is worse, because of the too-long input focal length for TM and the polarization dependence of the reverse trimming, and they are shifted to longer wavelengths by ~0.14 nm.

What is claimed is:

1. An apparatus for removing and/or adding wavelength channels comprising:
    a planar lightwave circuit integrated in a single chip, the planar lightwave circuit including:
        an input,
        a demultiplexer, the demultiplexer being coupled to the input and demultiplexing a plurality of wavelength channels at the input into a plurality of demultiplexer outputs, each demultiplexer output corresponding to one of the plurality of wavelength channels,
        a plurality of waveguides, each of the plurality of waveguides being coupled to a demultiplexer output,
        a plurality of optical switches having an input and first and second outputs, each input of the plurality of optical switches being coupled to a corresponding one of the plurality of waveguides, and
        a plurality of fixed mirrors with each mirror being coupled to the first output of a corresponding optical switch and being positioned to reflect a light beam therefrom,
    wherein each of the plurality of optical switches selectively directs a corresponding wavelength channel to the first output towards the corresponding mirror or to the second output.

2. The apparatus of claim 1, wherein the demultiplexer includes a waveguide grating router.

3. The apparatus of claim 1, wherein the optical switches include Mach-Zehnder switches.

4. The apparatus of claim 1, wherein the mirrors include at least one of a metal and a dielectric layer deposited on a facet of the lightwave circuit.

5. The apparatus of claim 1, wherein the planar lightwave circuit comprises silica waveguides.

6. An apparatus for removing and/or adding wavelength channels comprising:
   a planar lightwave circuit integrated in a single chip, the planar lightwave circuit including:
      an input,
      a demultiplexer, the demultiplexer being coupled to the input and demultiplexing a plurality of wavelength channels at the input into a plurality of demultiplexer outputs, each wavelength channel corresponding to at least two of the plurality of demultiplexer outputs,
      a plurality of waveguides, each of the plurality of waveguides being coupled to a demultiplexer output,
      a plurality of optical switches having an input and first and second outputs, each input of the plurality of optical switches being coupled to a corresponding one of the plurality of waveguides,
      a plurality of fixed mirrors with each mirror being coupled to the first output of a corresponding optical switch and being positioned to reflect a light beam therefrom, and
      a plurality of couplers, each coupler being coupled to the second outputs of at least two of the plurality of optical switches and coupling the at least two demultiplexer outputs corresponding to a wavelength channel of the plurality of wavelength channels,
      wherein each of the plurality of optical switches selectively directs the light beam to the first output towards the corresponding mirror or to the second output towards a coupler.

7. The apparatus of claim 6, wherein passbands of the demultiplexed channels overlap so as to form a substantially flat passband when added together.

8. The apparatus of claim 6, wherein the demultiplexer includes a waveguide grating router.

9. The apparatus of claim 6, wherein the optical switches include Mach-Zehnder switches.

10. The apparatus of claim 6, wherein the mirrors include dielectric layers deposited on a facet of the lightwave circuit.

11. The apparatus of claim 6, wherein the planar lightwave circuit comprises silica waveguides.

* * * * *